US 6,650,972 B1

(12) United States Patent
Robinson et al.

(10) Patent No.: US 6,650,972 B1
(45) Date of Patent: Nov. 18, 2003

(54) ESTIMATION, TRANSMISSION, RECEIPT, AND PRESENTATION OF VEHICLE SPECIFIC ENVIRONMENTAL CONDITIONS AND HAZARDS INFORMATION

(75) Inventors: Paul Aaron Robinson, Norfolk, VA (US); Roland L. Bowles, Glen Allen, VA (US)

(73) Assignee: AeroTech Research (U.S.A.), Inc., Hampton, VA (US)

( * ) Notice: Subject to any disclaimer, the term of this patent is extended or adjusted under 35 U.S.C. 154(b) by 38 days.

(21) Appl. No.: 10/083,840

(22) Filed: Feb. 27, 2002

Related U.S. Application Data

(63) Continuation-in-part of application No. 09/583,042, filed on May 26, 2000, now Pat. No. 6,381,538.

(51) Int. Cl.⁷ .......................... G06F 19/00; G01C 21/00
(52) U.S. Cl. ................... 701/3; 701/14; 702/3
(58) Field of Search ................ 701/3, 14; 702/3; 340/539.28

(56) References Cited

U.S. PATENT DOCUMENTS

| | | | |
|---|---|---|---|
| 3,781,530 A | 12/1973 | Britland et al. | |
| 4,521,857 A | 6/1985 | Reynolds, III | |
| 4,646,244 A | 2/1987 | Bateman et al. | |
| 5,187,478 A | 2/1993 | Grove | |
| 5,265,024 A | 11/1993 | Crabill et al. | |
| 5,541,591 A | 7/1996 | Bush | |
| 5,615,118 A | 3/1997 | Frank | |
| 5,654,700 A | 8/1997 | Prata et al. | |
| 5,657,009 A | 8/1997 | Gordon | |
| 5,751,289 A | 5/1998 | Myers | |
| 5,999,882 A | 12/1999 | Simpson et al. | |
| 6,014,606 A | 1/2000 | Tu | |
| 6,043,756 A | 3/2000 | Bateman et al. | |
| 6,085,147 A | 7/2000 | Myers | |
| 6,199,008 B1 | 3/2001 | Aratow et al. | |

FOREIGN PATENT DOCUMENTS

| | | | |
|---|---|---|---|
| JP | 11-223674 | * | 8/1999 |
| JP | 11-331062 | * | 11/1999 |

* cited by examiner

Primary Examiner—Michael J. Zanelli
(74) Attorney, Agent, or Firm—Kaufman & Canoles

(57) ABSTRACT

This invention combines meteorological, environmental, or dynamic vehicle data with data specific to a particular craft or vehicle, such as, for example, the weight, speed, acceleration, response characteristics, propulsion, mode of propulsion, and configuration, of a particular aircraft, and produces a simplified display map showing environmental conditions data as the environmental conditions data relates to that specific vehicle. The environmental conditions data is presented on the display map in the form of environmental condition annotations that have different coloring, shading, and/or iconization as determined by the type, severity, and area of the various environmental conditions relative to the vehicle. This invention separately provides travel route optimization for a particular craft or vehicle based on the combination of meteorological and other environmental data with data specific to the particular craft or vehicle. This invention also separately provides methods for transmitting environmental conditions information.

9 Claims, 11 Drawing Sheets

ESTIMATION, TRANSMISSION, RECEIPT, AND PRESENTATION OF VEHICLE SPECIFIC ENVIRONMENTAL CONDITIONS AND HAZARDS INFORMATION

CROSS-REFERENCE TO RELATED APPLICATIONS

This is a Continuation-in-Part of U.S. patent application Ser. No. 09/583,042, filed May 26, 2000, now U.S. Pat. No. 6,381,538, the entire disclosure of which is incorporated herein by reference.

BACKGROUND OF THE INVENTION

1. Field of the Invention

This invention relates to the estimation, transmission, receipt, and presentation of vehicle specific environmental conditions and hazards information.

2. Description of Related Art

Whether planning a flight, flying a pre-planned route, or altering a flight en route, pilots need up-to-date, accurate information on the environmental conditions that they are likely to encounter. Environmental conditions can include, for example, meteorological and other environmental conditions, such as, storms, rain, turbulence, lightning, icing, fog, volcanic ash, wind speed, wind direction, wind variation, or the like. Before a flight begins, available environmental conditions information must, at the very least, alert the pilot to the environmental conditions for the departure location, the arrival location, and the intended travel route. During the flight, the pilot must be able to access updated environmental conditions information not only for the present location of the aircraft, but also for the remainder of the intended travel route, the arrival location, and any alternate routes that may be used in case of emergency.

To accomplish this, the pilot typically receives environmental conditions information in the form of various maps, printouts, and/or displays that detail environmental conditions that the aircraft is likely to encounter. Some of the information sources, such as, for example, pressure or jet-stream maps, make the pilot aware of environmental conditions that affect the aircraft directly, such as, for example, wind speed. Other sources of information, such as, for example, radar reflectivity maps, or Nexrad data, advise the pilot of conditions that affect the aircraft indirectly. For example, raindrops, which do not affect the aircraft directly, appear as areas of high reflectivity on radar reflectivity maps and infer areas of turbulence.

The pilot must then compare all of the environmental conditions information that he or she receives with his or her knowledge, experience, and judgment, to determine a navigable course through the maze of environmental conditions.

To help the pilot to assimilate the vast amount of information, it is known to transmit weather data to the cockpit of an aircraft so that the weather data can be displayed and periodically updated. For example, in U. S. Pat. No. 5,265,024, to Crabill et al., describes a system for providing systematic, updated, weather information from the ground to the pilot. The '024 patent includes processor and display systems that display weather data in map-style depictions and as alphanumeric formats. The '024 patent also describes a display that provides overlays of mosaicked ground weather maps, lightning, and other Significant Meteorological Statements (Sigmets).

As an example of displaying environmental conditions information to a pilot, it is known to use enhanced weather radar to measure wind variations in an area ahead of an aircraft. The wind variation measurements are then processed to determine regions of potentially hazardous wind shear. These determined regions are then displayed on a map as a series of variable sized, color-coded pie shapes. The different color codes represent different intensities of wind variation, while the size of each pie shape shows an approximate size of the hazardous area. By understanding the color codes and the size variations of these displayed pie shapes, the pilot can take appropriate actions to negotiate a way through a hazardous area or avoid the hazardous area completely, without flying into another hazardous area.

SUMMARY OF THE INVENTION

When making flight decisions, the pilot cannot merely consider environmental conditions information in a vacuum, the pilot must also consider aircraft specific characteristics, such as, for example, the physical size, weight, propulsion, mode of propulsion, performance characteristics, and performance limitations of the aircraft that he or she is flying. Performance characteristics can include, for example, the type of control systems, control surfaces, the presence and functionality of any automated systems, and both the longitudinal and lateral aerodynamics of the aircraft. Performance limitations can include, for example, the aircraft's maximum speed and Mach number, buffet speed, operational ceiling, maximum weight, center of gravity, as well as the structural and mechanical limitations of the aircraft.

Some of the aircraft specific characteristics, such as the aircraft's size, propulsion, mode of propulsion, structure, type of control system(s), type of control surfaces, longitudinal aerodynamics, lateral aerodynamics, maximum weight, structural limitations, mechanical limitations, performance limitations, safety limitations, maximum operational ceiling, maximum Mach numbers, and maximum airspeeds are characteristics that are typically static and do not change during flight. Other of the aircraft specific characteristics, such as the aircraft's weight, performance characteristics, center of gravity, vertical acceleration, lateral acceleration, speed, angle of attack, angle of sideslip, and direction are typically dynamic, and change during flight.

Furthermore, certain types of environmental conditions affect different aircraft in different ways and to varying degrees while other types of environmental conditions affect all aircraft in much the same way and to much the same degree. For example, storms, turbulence, icing, fog, volcanic ash, winds, or the like, can affect a large, jet-engine aircraft differently than a small, propeller-driven aircraft. In contrast, environmental conditions, such as, for example, ground terrain, structures, lightning, or the like, can affect both large and small aircraft alike.

To illustrate, a large multi-engine passenger aircraft might be able to fly, safely and comfortably, through an area of turbulence that would cause a small single-engine aircraft to be thrown about quite violently. However, that same, large multi-engine passenger aircraft will react differently when it is loaded with passengers, fuel, or cargo than it will when it is relatively empty. Furthermore, a private jet, with an excess of available power, can fly in conditions that a small, single engine, propeller-driven aircraft cannot. But, both large and small aircraft alike can be catastrophically affected by, for example, a lightning strike.

As a further illustration, the altitude of the aircraft may determine whether and to what extent the aircraft encounters certain environmental conditions, such as turbulence. For example, there might be an area of thunderstorms that can be avoided if the pilot files over the storms at a higher altitude. Unfortunately, the operational ceiling of the aircraft may not allow the aircraft to fly high enough to travel over the storms. Alternatively, the operational ceiling of the aircraft may be limited because of certain performance limitations of the aircraft. Additionally, the pilot of the aircraft may not be allowed, if, for example, the pilot is only visual flight rules (VFR) rated, to fly above a predetermined altitude. Furthermore, air traffic control (ATC) may not allow the pilot to make an altitude change.

Therefore, because the impact of any given set of environmental conditions is not the same for every aircraft, and different aircraft react very differently to different environmental conditions, the pilot must consider not only the present environmental conditions that the aircraft is about to encounter, but also the specific flight characteristics of the aircraft that he or she is flying.

Thus, a system that combines environmental conditions information with aircraft specific information and produces a simplified display map showing any environmental conditions that are relevant to a particular aircraft, improves pilot awareness, reduces the workload on the pilot, and improves the safety level to the aircraft, the pilot, and any passengers and/or cargo onboard.

Thus, in contrast to the example of merely displaying environmental conditions information described above, this invention allows the pilot to look at the display map without having to determine, for example, which color-coded pie shapes represent wind variations that are intense enough to adversely affect his or her particular aircraft. To the contrary, the display map of this invention only displays environmental conditions that exceed a determined threshold and can actually affect the pilot's particular aircraft. Thus, in contrast to the example described above, the display map of this invention will only show areas of wind variation that are intense enough to adversely affect the pilot's aircraft.

This invention also optimizes a travel route based on both environmental conditions information and aircraft specific information. The travel route may be optimized based on default criteria or criteria selected by the pilot, such as, for example, best fuel economy, most comfortable ride, fastest traverse of a particular region, and/or changing configuration of the aircraft. The travel route may be altered or updated by this invention based on either a request from the user or a change in either the environmental conditions or the aircraft characteristics.

In various exemplary embodiments, the systems and methods of this invention are able to produce projected dynamic vehicle information such that the status of certain of the aircraft characteristics, such as, for example, the aircraft's weight, can be projected for at least one point along a travel route.

It should be appreciated that the embodiments described above involve displaying environmental conditions data relative to a specific aircraft. However, in various exemplary embodiments of this invention, the environmental conditions data is processed and displayed in other vehicles, such as, for example, helicopters, watercraft, hovercraft, automotive vehicles, or the like.

When the vehicle is, for example, an aircraft, the environmental conditions information may include, for example, cloud type, cloud altitude, visibility, storms, rain, precipitation, turbulence, lightning, icing, fog, volcanic ash, wind speed, wind direction, wind variation, temperature, restricted areas, or the like. It should also be appreciated that the environmental conditions information is displayed relative to each particular aircraft's attributes, such as, for example, the physical size, weight, direction, speed, propulsion, mode of propulsion, response characteristics, performance characteristics, performance limitations, or the like of the aircraft.

When the vehicle is, for example, a watercraft, the environmental conditions information may include, for example, water temperature, water depth, water conditions, wave height, wind speed, wind direction, water current, water undercurrent data, or the like. It should also be appreciated that the environmental conditions information is displayed relative to each particular watercraft's attributes, such as, for example, size, weight, speed, propulsion, mode of propulsion, hull design, draft, performance characteristics, response characteristics, or the like.

When the vehicle is, for example, an automotive vehicle, the environmental conditions information may include, for example, weather conditions, wind speed, wind direction, accumulated precipitation information, road conditions, grade of terrain traversed, or the like. It should also be appreciated that the environmental conditions information is displayed relative to each particular automotive vehicle's attributes, such as, for example, two wheel or four wheel drive, gross vehicle weight, speed, height, center of gravity, or the like. If, for example, the vehicle is a tractor-trailer, the display may include wind speed and direction information so that a driver can avoid areas of crosswinds that are strong enough to tip the vehicle or force the vehicle off of a road.

Accordingly, this invention provides apparatuses, systems, and methods that present a user with a simplified environmental conditions map based on a scientific and technical analysis of both environmental conditions information and data specific to the vehicle that the user is operating.

This invention separately provides apparatuses, systems, and methods that produce a simplified, integrated, iconized map including environmental conditions information indicating the location, spatial extent, and severity of each environmental condition.

This invention separately provides apparatuses, systems, and methods that update vehicle specific data to reflect changes to the vehicle's weight, performance characteristics, and/or configuration.

This invention separately provides apparatuses, systems, and methods that simplify the route-planning task by suggesting optimized routings based on minimizing certain parameters.

This invention separately provides apparatuses, systems, and methods that plot and/or update a travel plan using both environmental conditions information and data specific to the vehicle that the user is operating.

This invention separately provides apparatuses, systems, and methods that automatically suggest courses of travel, either prior to departure or while en route, through or around various environmental conditions based on the specific characteristics of a particular vehicle.

This invention separately provides apparatuses, systems, and methods that optimize a course around various environmental conditions based on specific criteria, such as, for example, best fuel economy, most comfortable ride, fastest traverse of a particular region, and/or changing configuration of the vehicle.

This invention separately provides apparatuses, systems, and methods that can be used prior to departure or onboard a vehicle to interpret weather and/or environment data that is transmitted or broadcast to the vehicle.

This invention separately provides apparatuses, systems, and methods that provide the user with improved situational awareness of hazards to the user's specific vehicle.

This invention separately provides apparatuses, systems, and methods that improve safety by reducing the impact of adverse environment conditions on a specific vehicle.

This invention separately provides apparatuses, systems, and methods that produce timely and useful alerts, as well as transmit additional alerts if the environmental conditions change.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein.

DETAILED DESCRIPTION OF THE PREFERRED EMBODIMENT

For simplicity and clarification, the operating principles, design factors, and layout of the environmental conditions display systems, methods, and apparatuses according to this invention are explained with reference to various exemplary embodiments of environmental conditions display systems, methods, and apparatuses according to this invention. The basic explanation of the operation of the environmental conditions display systems, methods, and apparatuses is applicable for the understanding and design of the constituent components employed in the environmental conditions display systems, methods, and apparatuses of this invention.

Furthermore, it should be appreciated that, for simplicity and clarification, the embodiments of this invention will be described with reference to the environmental conditions display systems, methods, and apparatuses as they operate in an aircraft. Alternatively, the systems, methods, and apparatuses of this invention can be implemented in other vehicles, such as, for example, helicopters, watercraft, hovercraft, automotive vehicles, or the like.

It should also be appreciated that the term "environmental conditions" is for basic explanation and understanding of the operation of the environmental conditions display systems, methods, and apparatuses. Therefore, the term "environmental conditions" is not to be construed as limiting the environmental conditions display systems, methods, and apparatuses of this invention.

Figure 1:
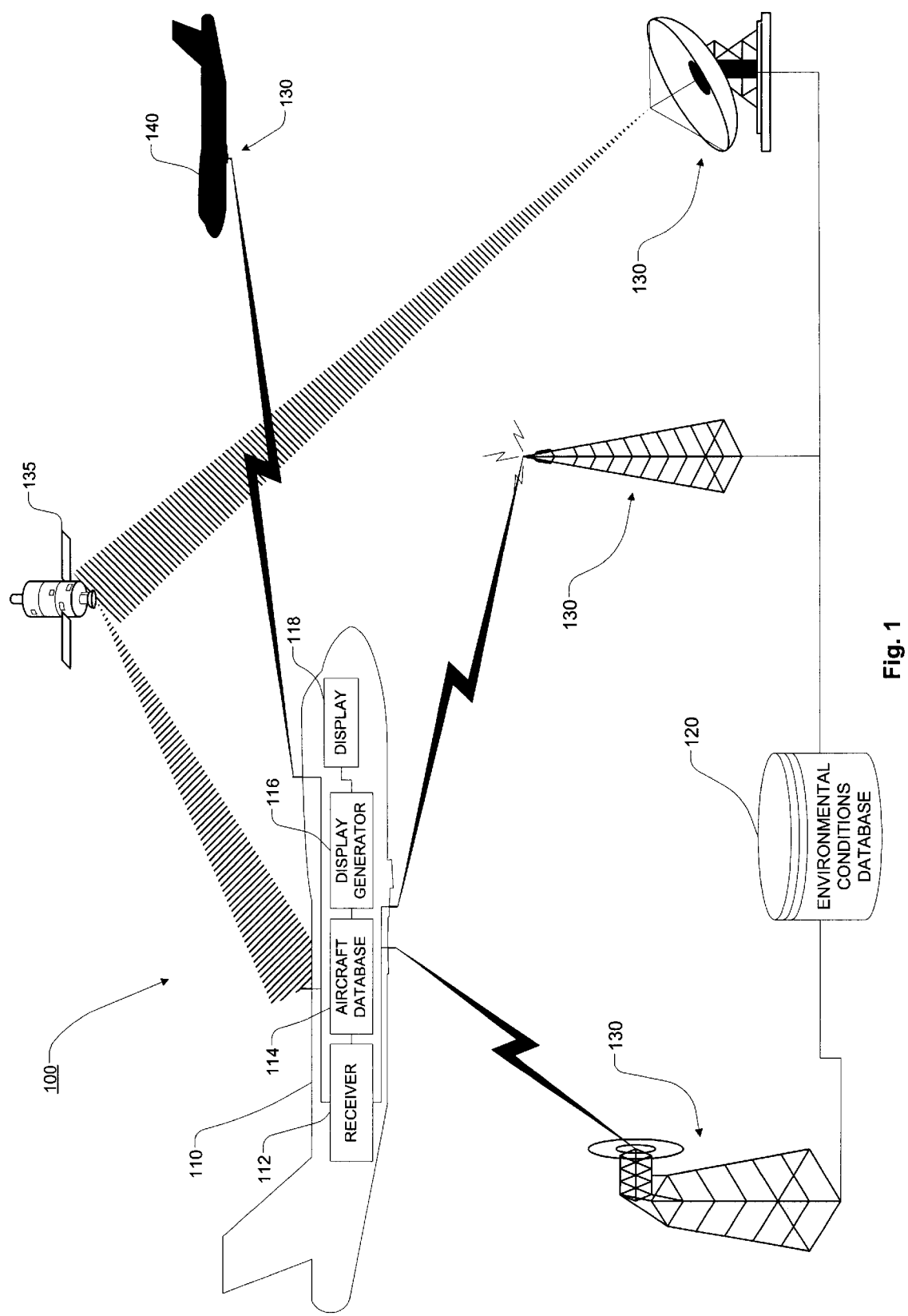
FIG. 1 shows a first exemplary embodiment of the environmental conditions display system according to this invention.

FIG. 1 shows an environmental conditions display system incorporating a first exemplary embodiment of an environmental conditions display system 100 according to this invention. As shown in FIG. 1, the environmental conditions display system 100 includes at least some of an aircraft 110, an environmental conditions database 120, and at least one environmental conditions transmitter 130.

The aircraft 110 includes at least some of a receiver 112, an aircraft characteristics database 114, a display generator 116, and a display 118. In various exemplary embodiments, the display generator 116 interfaces, via the receiver 112, with the at least one environmental conditions transmitter 130. The display generator 116 also interfaces with the aircraft characteristics database 114 and the display 118.

In the various exemplary embodiments, the aircraft characteristics database 114 includes a database that stores static aircraft specific information and a database that stores dynamic aircraft specific information. In various exemplary embodiments, various systems and/or sensors of the aircraft 110 periodically update the dynamic aircraft specific information stored in the aircraft characteristics database 114.

At least some of the dynamic aircraft specific information in the database may include predetermined or default dynamic aircraft specific information. In this manner, if an aircraft does not include the necessary systems and/or sensors to monitor or update all of the dynamic aircraft specific information, predetermined values may be used. Additionally, at least some of the static aircraft specific information in the database may include predetermined or default static aircraft specific information. Thus, for example, published standards for a particular class of aircraft may be used as the default values for an individual aircraft's static characteristics.

In the various exemplary embodiments described herein, the display generator 116 is an environmental conditions display system 500, as shown below, with reference to FIG. 5. In various exemplary embodiments, the display generator 116 interfaces, for example, with the environmental conditions database 120, via a wireless link using the receiver 112 and the at least one environmental conditions transmitter 130. Alternatively, the display generator 116 can interface with the environmental conditions database 120, either directly or indirectly, via any linked connection. The linked connection can be any known or later developed device or system for connecting the display generator 116 to the environmental conditions database 120, including a direct wired connection, a connection over a LAN, a WAN, or any other distributed network, a connection over the public switched telephone network, a connection over a coaxial cable (i.e., CATV) system, a connection over a cellular telephone network, a very high frequency (VHF) connection, an ultra high frequency (UHF) connection, a radio frequency (RF) connection, a satellite connection, or the like. In general, the linked connection can be any known or later developed connection system or structure usable to connect the display generator 116 to the environmental conditions database 120, including both wired and wireless connections.

In various exemplary embodiments, the display generator 116 interfaces with the display 118. The display 118 can be a cathode ray tube display, a liquid crystal display, a plasma display, a light emitting diode (LED) display, or any other known or later developed system capable of displaying data.

In various exemplary embodiments, the at least one environmental conditions transmitter 130 is, for example, a VHF transmitter, a UHF transmitter, a RF transmitter, a satellite transmitter, or the like. When the at least one environmental conditions transmitter 130 is, for example, a satellite transmitter, the at least one environmental conditions transmitter 130 operates in conjunction with at least one satellite 135. In various exemplary embodiments, the at least one environmental conditions transmitter 130 is, for example, a transmitter included in another aircraft that transmits environmental conditions information. Thus, in various exemplary embodiments, the receiver 112 includes at least one of a VHF antenna, a UHF antenna, a RF antenna, a satellite communications receiver, or the like.

During operation of the environmental conditions display system 100, the display generator 116, receives, via the receiver 112, signals from the at least one environmental conditions transmitter 130. The signals from the at least one environmental conditions transmitter 130 contain at least some environmental conditions data from the environmental conditions database 120. In various exemplary embodiments, the signals also include global positioning system (GPS) data, which allows the systems, methods, and apparatuses of this invention to determine the location and/or the speed of the aircraft. In the various exemplary embodiments, the display generator 116 includes an environmental conditions database that stores at least the received environmental conditions data from the environmental conditions database 120.

When the display generator 116 receives the environmental conditions data, the display generator 116 compares the environmental conditions data to the static and dynamic aircraft characteristics stored in the aircraft characteristics database 114, as described above, and determines whether there are any environmental conditions that exceed a determined threshold and will affect the aircraft. The display generator 116 then creates a display map that includes all of the environmental conditions that will affect the aircraft and sends the map to the display 118 to be displayed.

In various exemplary embodiments, the displayed map is automatically updated periodically to reflect changes not only to the aircraft location and the environmental conditions, but also to the aircraft characteristics, such as, for example, the reduced weight of the aircraft due to fuel consumption, payload discharge, or weapons release.

Figure 2:
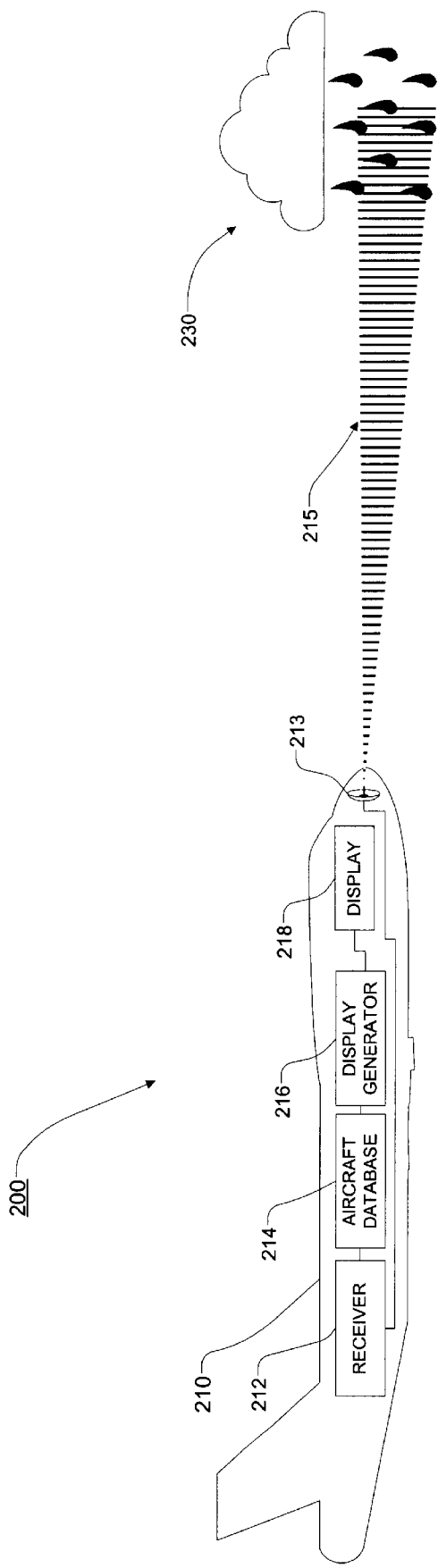
FIG. 2 shows a second exemplary embodiment of the environmental conditions display system according to this invention.

FIG. 2 shows an environmental conditions display system incorporating a second exemplary embodiment of an environmental conditions display system 200 according to this invention. As shown in FIG. 2, the environmental conditions display system 200 includes at least some of an aircraft 210, a receiver 212, an aircraft characteristics database 214, a display generator 216, and a display 218.

The elements of the environmental conditions display system 200 correspond to and operate similarly to the same elements discussed above with respect to the environmental conditions display system 100 of FIG. 1. However, in various exemplary embodiments, the environmental conditions display system 200 does not require the at least one environmental conditions transmitter 130 in order to receive the environmental conditions information.

In various exemplary embodiments of the environmental conditions display system 200, the display generator 216 receives, via the receiver 212, environmental conditions information from an onboard system or various onboard systems, such as, for example, an onboard monitoring system 213. In various exemplary embodiments, the onboard monitoring system 213 is a weather radar, an infrared (IR) sensor, a laser radar (LIDAR), or the like.

Thus, the environmental conditions display system 200 provides a map of an area based on the static and dynamic characteristics of the aircraft received from the aircraft characteristics database 214 and the environmental conditions information received from the onboard monitoring system 213, as described above.

Figure 3:
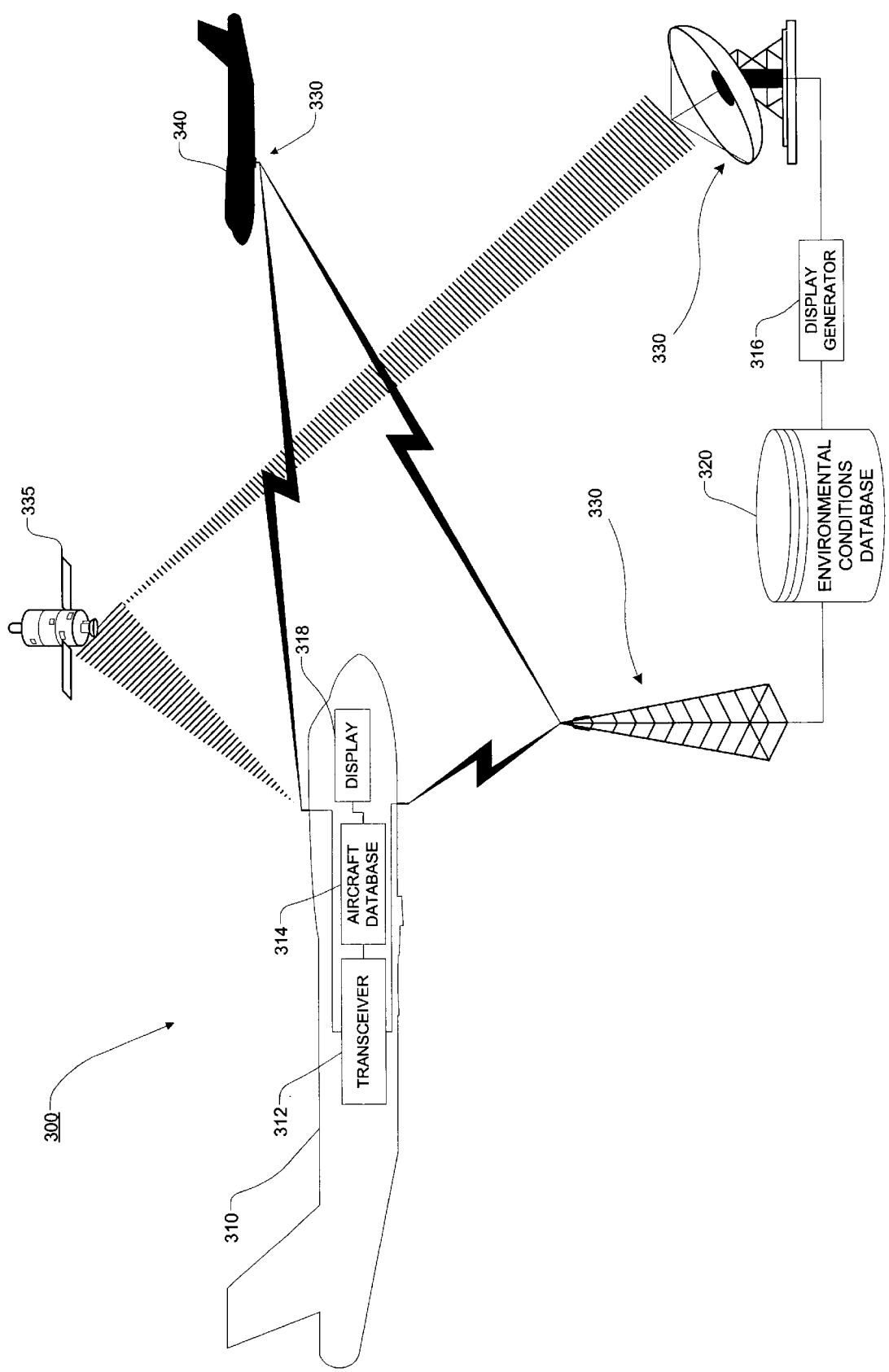
FIG. 3 shows a third exemplary embodiment of the environmental conditions display system according to this invention.

FIG. 3 shows an environmental conditions display system incorporating a third exemplary embodiment of an environmental conditions display system 300 according to this invention. As shown in FIG. 3, the environmental conditions display system 300 includes at least some of an aircraft 310, a transceiver 312, an aircraft characteristics database 314, a display generator 316, a display 318, an environmental conditions database 320, at least one remote transceiver 330, and optionally at least one satellite 335, and a transmitting aircraft 340.

The elements of the environmental conditions display system 300 correspond to and operate similarly to the same elements discussed above with respect to the environmental conditions display system 100 of FIG. 1. However, in various exemplary embodiments of the environmental conditions display system 300, the receiver 112, as shown in FIG. 1, is replaced with the transceiver 312. However, it should be understood that the receiver 112 and the transceiver 312 may be similar or identical pieces of equipment, but for explanation purposes, the receiver 112 was described as primarily receiving data, while the transceiver 312 will be described as primarily transmitting data. Furthermore, the display generator 316 is located remote from the aircraft 310.

During operation, the environmental conditions display system 300 operates similarly to the environmental conditions display system 100, as shown in FIG. 1. However, the aircraft 310 transmits, via the transceiver 312, the aircraft specific information to the at least one remote transceiver 330. The at least one remote transceiver 330 then transfers the aircraft specific information to the display generator 316. The display generator 316 then prepares the display map using the aircraft specific information received from the aircraft 310 and the environmental conditions information received from the environmental conditions database 320, as described above, with reference to FIG. 1. When the display map is prepared, display map data is transferred, via the at least one remote transceiver 330, to the transceiver 312. The transceiver 312 then transfers the display map data to the display 318 to be displayed.

In this manner, the hardware and software needed to process the environmental conditions information and the aircraft specific information is stored remote from the aircraft 310. Thus, less space is required onboard the aircraft 310 for the environmental conditions display system 300.

Figure 4:
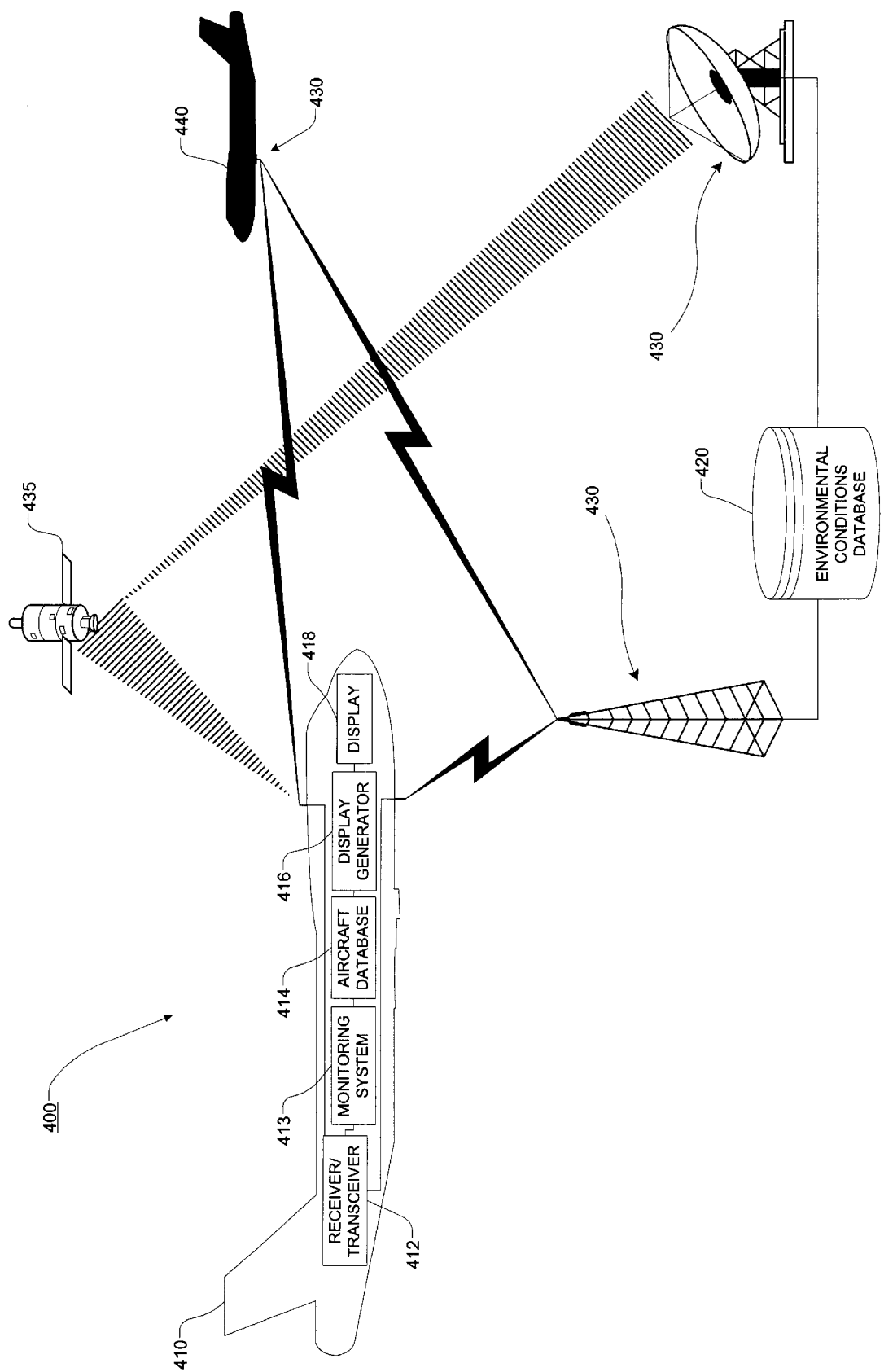
FIG. 4 shows an environmental conditions reporting system according to this invention.

FIG. 4 shows an environmental conditions reporting system 400 according to this invention. As shown in FIG. 4, the environmental conditions reporting system 400 includes at least some of an aircraft 410, a receiver/transceiver 412, an onboard monitoring system 413, an aircraft characteristics database 414, a display generator 416, a display 418, an environmental conditions database 420, at least one environmental conditions transmitter/remote transceiver 430, and optionally at least one satellite 435, and a receiving aircraft 440.

The elements of the environmental conditions reporting system 400 may correspond to and may operate similarly to the same elements discussed above with respect to the environmental conditions display system 100 of FIG. 1, the environmental conditions display system 200 of FIG. 2, or the environmental conditions display system 300 of FIG. 3. Thus, in various exemplary embodiments, the environmental conditions reporting system 400 may, for example, receive environmental conditions information from a remote source, such as the transceiver 430 or local source, such as the onboard monitoring system 413. Likewise, the environmental conditions reporting system 400 may operate, for example, with the display generator 416 located remote from the aircraft 410 or with the display generator 416 located onboard the aircraft 410.

In various exemplary embodiments of the environmental conditions reporting system 400, the transmitting aircraft 140, as shown, for example, in FIG. 1, is replaced by a receiving aircraft 440. It should be understood that the transmitting aircraft 140 and the receiving aircraft 440 may be identically equipped aircraft, but for explanation purposes, the receiving aircraft 440, of FIG. 4, will be described as primarily receiving data, while the transmitting aircraft 140, of FIG. 1, was described as primarily transmitting data. Furthermore, the aircraft 410 and the aircraft 110 may be identically equipped aircraft; however, the aircraft 410 must include the onboard monitoring system 413.

The onboard monitoring system 413 includes onboard monitoring and/or sensing equipment that provides data regarding certain of the dynamic vehicle conditions, such as, for example, performance characteristics, center of gravity, vertical acceleration, lateral acceleration, speed, angle of attack, angle of sideslip, and direction, and the like. Data from these sensors and systems is used to determine the effect environmental conditions are having on the aircraft 410, and the strength of the turbulence the aircraft 410 is experiencing. In various exemplary embodiments, the onboard monitoring system 413 may include a weather radar, an infrared (IR) sensor, a laser radar (LIDAR), or the like. Appropriate sensors and systems for monitoring, sensing, and measuring the effects of environmental conditions on an aircraft are well known in the art.

In the various exemplary embodiments, the aircraft characteristics database 414 includes a database that stores environmental conditions threshold values. The environmental conditions threshold values represent values that, when exceeded, indicate a level of environmental conditions, such as turbulence, which may adversely effect an aircraft other than the aircraft 410, such as the receiving aircraft 440. This threshold may not be at a level hazardous to the aircraft 410, but at a level that will be hazardous to the receiving aircraft 440.

During operation of the environmental conditions reporting system 400, when dynamic vehicle information is received from the monitoring system 413, the aircraft characteristics database 414 uses various algorithms to determine an environmental conditions value for the received environmental conditions information this value represents the severity of the environmental conditions.

Once the environmental conditions value is determined, the environmental conditions value is compared to an environmental conditions threshold value in the aircraft characteristics database 414. If the environmental conditions value has reached or exceeded the given environmental conditions threshold value, data relating to the environmental conditions is transmitted. The transmitted environmental conditions information contains data relating to the dynamic vehicle information, the environmental conditions, the environmental conditions value, and/or the environmental conditions threshold value. The transmitted environmental conditions information also contains sufficient information to interpret the transmitted data once received. The transmitted data may also contain static or additional dynamic information regarding the aircraft 410.

It should also be appreciated that the transmitted data or information may be transmitted in an encrypted or coded fashion, such that the transmitted data or information may only be interpreted by authorized recipients. Furthermore, the data or information may be transmitted to a ground-based receiver, an airborne receiver, or a space-based receiver. The receiver may, for example be a specific receiver, such as a specific receiving aircraft 440, or a general receiver, such as any aircraft within a predetermined distance from the aircraft 410.

For example, if the aircraft 410 is a relatively large aircraft, it may experience a level of turbulence that is almost negligible and well below an environmental conditions threshold value for turbulence that would adversely effect the aircraft 410 or cause the turbulence to be displayed on the display 418. Nonetheless, the environmental conditions reporting system 400 will, using appropriate algorithms and environmental conditions threshold values included in the aircraft characteristics database 414, may determine that the environmental conditions value is above an environmental conditions threshold value for some smaller aircraft, such as the receiving aircraft 440.

The systems and methods of the environmental conditions reporting system 400 will then transmit data representing the level of turbulence the aircraft 410 is experiencing, such that the data could be received by the receiving aircraft 440. The data may be transmitted via direct transmission to the receiving aircraft 440 and received by the receiving aircraft's transceiver 430, or via indirect transmission, by way of a ground-based transceiver 430 or satellite-based transceiver 435 and received by the receiving aircraft's transceiver 430.

When the receiving aircraft 440 receives this data, the data is interpreted and the level of hazard to the receiving aircraft 440 is determined, as further described herein, and appropriately displayed.

Likewise, if the aircraft 410 is a relatively small aircraft, it may experience a level of turbulence that is extreme for the aircraft 410, but is well below a threshold value for turbulence that would adversely effect any larger aircraft, such as the receiving aircraft 440. In this case, the systems and methods of the environmental conditions reporting system 400 may not transmit data representing the level of turbulence the aircraft 410 is experiencing, because the receiving aircraft 440 would not be adversely effected by the level of turbulence and it is unnecessary for the turbulence to be displayed to the pilot of the receiving aircraft 440.

In this manner, the environmental conditions reporting system 400 is able to transmit environmental conditions information or environmental conditions values only when a particular environmental conditions threshold value is exceeded. This reduces or eliminates continuous constant streaming of environmental data (including null reports).

It should be appreciated that although the environmental conditions reporting system 400 has been described as being located and operating onboard the aircraft 410, in various exemplary embodiments, the environmental conditions reporting system 400 may be located and operate as a ground-based or satellite-based system. In these various embodiments, a ground-based or satellite-based sensors monitor the environmental conditions and transmit environmental conditions information when particular environmental conditions threshold values are reached.

Figure 5:
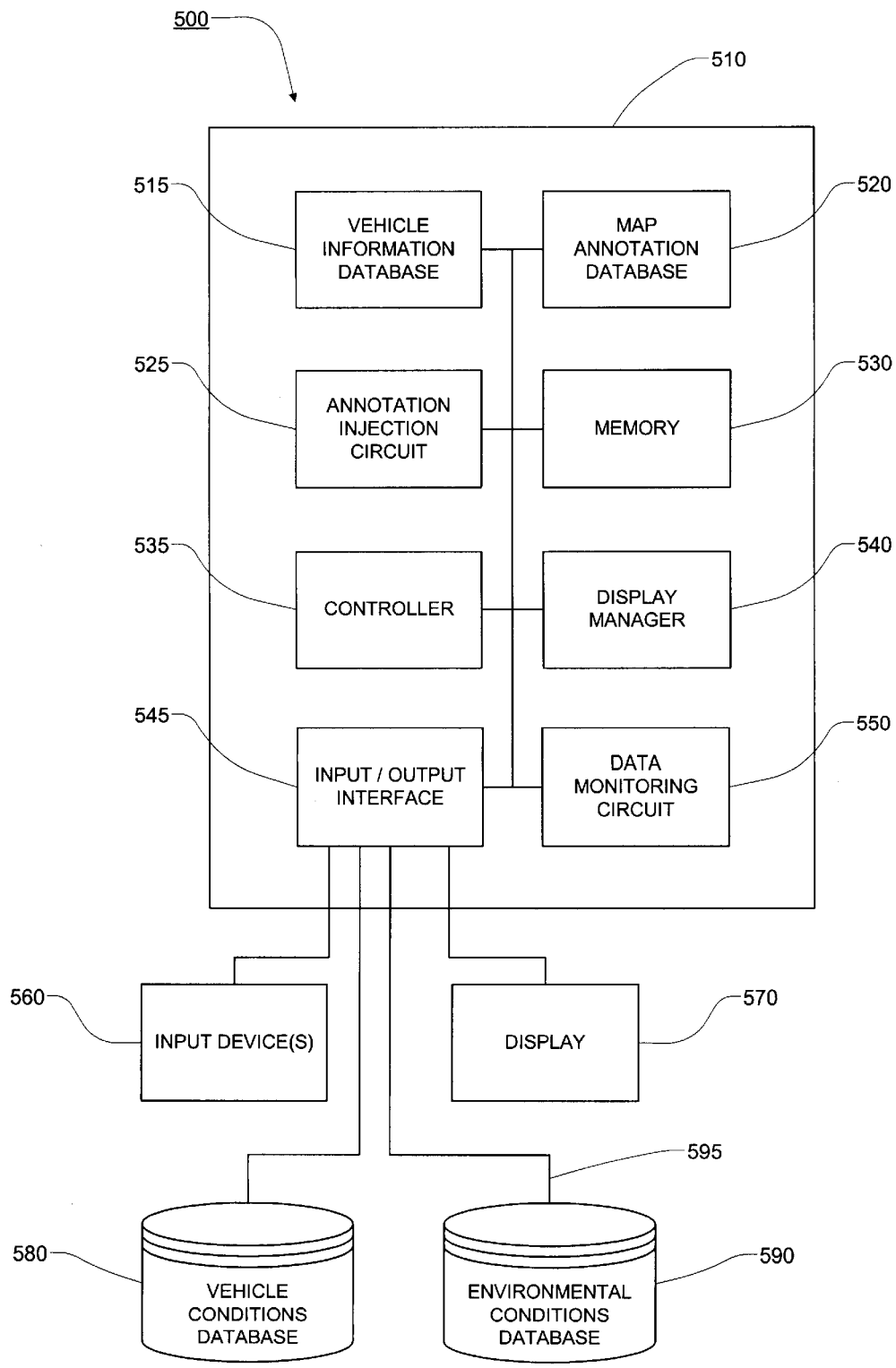
FIG. 5 is a functional block diagram outlining an exemplary embodiment of the environmental conditions display system according to this invention.

FIG. 5 is a functional block diagram outlining an exemplary embodiment of an environmental conditions display system 500 according to this invention. As shown in FIG. 5, one exemplary embodiment of an environmental conditions display system 500 includes a computer or central processing unit (CPU) 510, one or more input devices 560, a display 570, a vehicle conditions database 580, and an environmental conditions database 590.

The computer or CPU 510 includes at least some of a vehicle information database 515, a map annotation database 520, an annotation injection circuit 525, a memory 530, a controller 535, a display manager 540, an input/output interface 545, and a data monitoring circuit 550. The computer or CPU 510 interfaces with the one or more input devices 560 and the display 570 through the input/output interface 545. Additionally, the computer or CPU 510 interfaces with both the vehicle conditions database 580 and the environmental conditions database 590, via a linked connection 595, through the input/output interface 545.

In various exemplary embodiments, the memory 530 can be implemented using any appropriate combination of alterable, volatile or non-volatile memory or non-alterable, or fixed, memory. The alterable memory, whether volatile or non-volatile, can be implemented using any one or more of non-selectable or dynamic RAM, a floppy disk and disk drive, a writable or re-writable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In various exemplary embodiments, the memory 530 stores software and data including a software program and specific algorithms used by the environmental conditions display system 500. For example, the memory 530 stores map display software and communication software. Map display software and communications software are familiar to those of ordinary skill in the art.

The controller 535 manages reading data from and writing data to the memory 530. The controller 535 also drives the transmission of data to and the reception of data from the one or more input devices 560, the environmental conditions database 590, and the display 570, through the input/output interface 545.

The data monitoring circuit 550 monitors incoming data from the vehicle conditions database 580 and the environmental conditions database 590.

The vehicle conditions database 580 at least stores dynamic aircraft data specific to the particular aircraft that is being flown. In various exemplary embodiments, the dynamic aircraft data includes data about the aircraft characteristics that change during flight, such as, the aircraft's weight, performance characteristics, center of gravity, vertical acceleration, lateral acceleration, configuration, functionality of any automated control systems, or the like.

The environmental conditions database 590 includes information relating to weather and other environmental conditions. In various exemplary embodiments, the environmental conditions database 590 is located in the aircraft itself, and receives environmental condition information from, for example, an onboard radar system. In various other exemplary embodiments, the environmental conditions database 590 is a remote database, which transmits the environmental conditions information to the aircraft. In still other exemplary embodiments, the environmental conditions database 590 is an airborne database located in, for example, another aircraft or a satellite, which transmits the environmental conditions information to the aircraft.

The vehicle information database 515 at least stores static data specific to the particular aircraft that is being flown. In various exemplary embodiments, the static data includes data about the aircraft that does not change during flight, such as, the aircraft's size, propulsion, mode of propulsion, structure, type of control system(s), type of control surfaces, longitudinal aerodynamics, lateral aerodynamics, maximum weight, structural limitations, mechanical limitations, performance limitations, safety limitations, maximum operational ceiling, maximum Mach numbers, maximum airspeeds, or the like.

The map annotation database 520 stores environmental condition annotations to be added to the maps stored in the memory 530. The environmental condition annotations might be, for example, a particular style or color of shading, or an icon that is displayed on a map to alert a pilot to certain environmental conditions, as described above. The annotation injection circuit 525 injects the environmental condition annotations in one or more appropriate locations, as dictated by the controller 535 and the vehicle information database 515, into the map or maps stored in the memory 530.

In various exemplary embodiments, the display manager 540 drives the display 570. The display 570 can be a cathode ray tube display, a liquid crystal display, a plasma display, a light emitting diode (LED) display, or any other known or later developed system capable of displaying data. The one or more input devices 560 can be one or more of a keyboard, a mouse, a touch screen, a switch, a knob, a button, an enable widget, a touch pad, a microphone or any other known or later developed device capable of inputting data.

In the various exemplary embodiments described herein, the computer or CPU 510 interfaces, for example, with the vehicle conditions database 580 and the environmental conditions database 590.

In the various exemplary embodiments described herein, the computer or CPU 510 interfaces, for example, with the environmental conditions database 590, through the linked connection 595 using the input/output interface 545. Alternatively, the computer or CPU 510 can interface with the environmental conditions database 590, through a direct wired connection. The linked connection 595 can be any known or later developed device or system for connecting the computer or CPU 510 to the environmental conditions database 590, including a wireless link, a connection over a LAN, a WAN, or any other distributed network, a connection over the public switched telephone network, a connection over a coaxial cable (i.e., CATV) system, a connection over a cellular telephone network, a very high frequency (VHF) connection, an ultra high frequency (UHF) connection, a radio frequency (RF) connection, a satellite connection, or the like. In general, the linked connection 595 can be any known or later developed connection system or structure usable to connect the computer or CPU 510 to the environmental conditions database 590, including both wired and wireless connections.

In the various exemplary embodiments described herein, the computer or CPU 510 interfaces, for example, with the one or more input devices 560 and/or the display 570, through a direct wired connection. Alternatively, the computer or CPU 510 can interface with the one or more input devices 560 and/or the display 570, through a linked connection, as described above, using the input/output interface 545.

In various exemplary embodiments, the environmental conditions display system 500 will be included as part of the software executing on the computer or CPU. It should be appreciated that any other known or later developed system capable of processing and outputting data could be used in place of the computer or CPU. While generating environmental conditions annotations based on environmental conditions information and vehicle specific information is not currently known, appropriate software for coordinating with, for example, the display 570 and displaying the graph data included in the environmental conditions annotations is elementary, and essentially the same as found in the prior art systems.

During operation of one exemplary embodiment of the environmental conditions display system 500, the input/output interface 545 receives aircraft specific information from the aircraft conditions database 580 and environmental conditions information from the environmental conditions database 590. As the environmental conditions display system 500 receives the aircraft specific information and the environmental conditions information, the data monitoring circuit 550 monitors all of the information that is contained in the received aircraft specific and environmental conditions information.

The controller 535 then sends the aircraft specific and environmental conditions information to the memory 530, where information from the vehicle information database 515 and the map annotation database is included. The algorithms within the memory 530 then determine appropriately iconized environmental conditions annotations for each environmental condition that is strong enough to affect the aircraft, as described above.

As appropriate environmental conditions annotations are determined, the annotation injection circuit 525 injects the appropriate environmental conditions annotations in one or more appropriate locations in appropriate map information stored in the memory 530.

The map information including the appropriate environmental conditions annotations is then sent to the display manager so that an environmental conditions display map can be produced. Once the environmental conditions display map is produced, the environmental conditions display map is transmitted, through the input/output interface 545, to the display 570.

When the environmental conditions display map is displayed, the pilot can use the one or more input devices 560 to alter the display field as further described herein.

Figure 6:
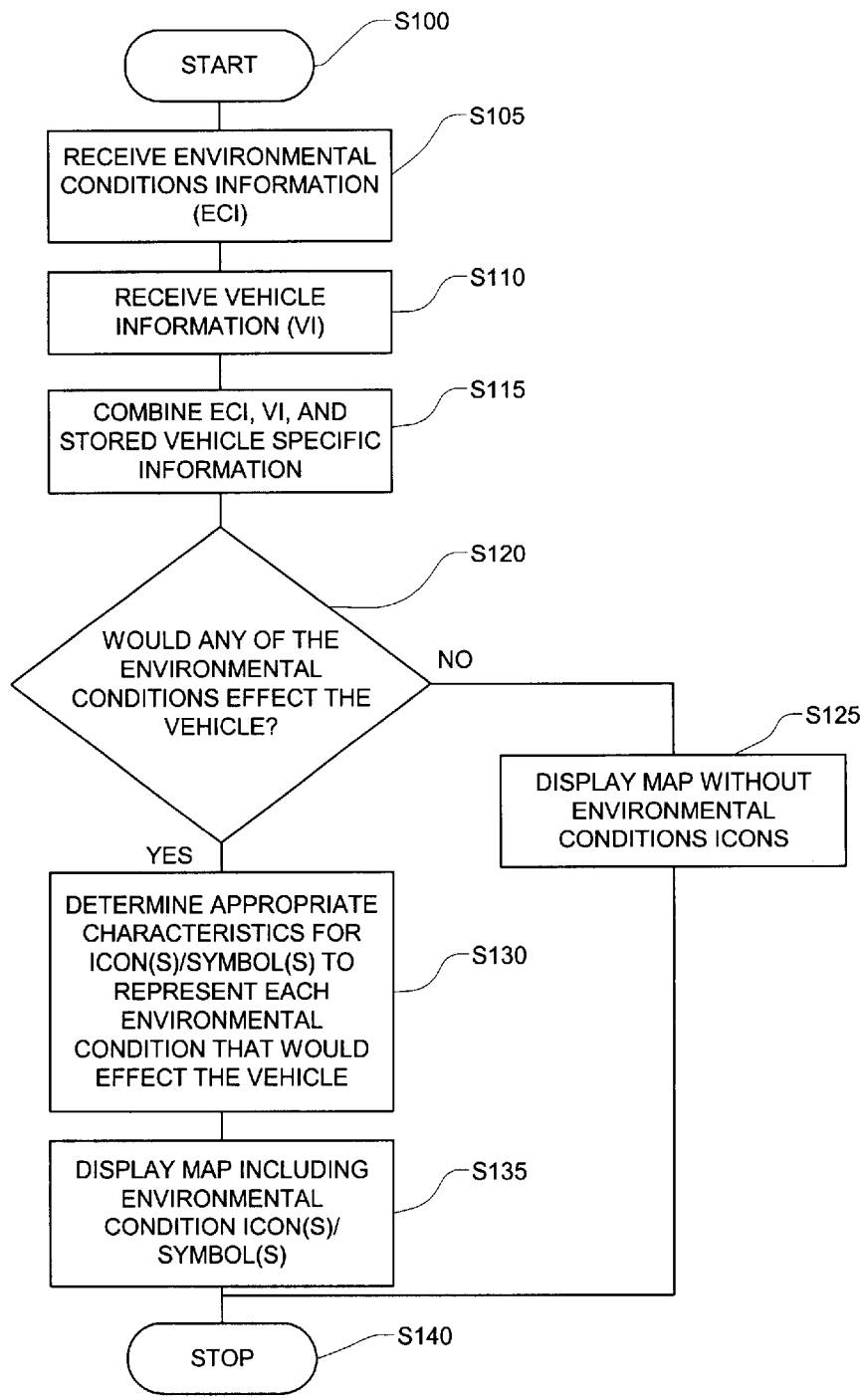
FIG. 6 is a flowchart outlining one exemplary embodiment of a method for using the environmental conditions display system according to this invention.

FIG. 6 is a flowchart outlining one exemplary embodiment of a method for using the environmental conditions display system according to this invention. In various exemplary embodiments, as environmental conditions information is received, a display map is created and/or updated to show the environmental conditions as the environmental conditions relate to a particular vehicle.

In various exemplary embodiments, environmental condition annotations include one or more styles or colors of shading, or icons that are displayed on the display map to alert the user to certain environmental conditions, as described above. Additionally, custom environmental condition annotations can be added as dictated by the user.

As shown in FIG. 6, beginning in step S100, control continues to step S105 where environmental conditions information is received. Then, in step S110, vehicle information is received. Next, in step S115, the received environmental conditions information is combined with the received vehicle information and with stored vehicle specific information. Control then continues to step S120.

In step S120, a determination is made whether any of the received environmental conditions information represent environmental conditions that are severe enough to affect the particular vehicle. If, in step S120, it is determined that none of the environmental conditions are severe enough to affect the particular vehicle, control advances to step S125. Otherwise, control jumps to step S130.

In step S125, a display map is produced that does not include any environmental condition annotations. Control then jumps to step S140.

In step S130, appropriate characteristics, such as, for example, shading, coloring, iconization, or the like, are determined to reflect the spatial extent and severity of each environmental conditions annotation that represents an environmental condition that is severe enough to affect the particular vehicle. Then, in step S135, a display map is produced that includes an appropriate environmental condition annotation for each environmental condition that is severe enough to affect the particular vehicle. Control then continues to step S140 where the method ends.

It should be understood that the method for using the environmental conditions display system described above can be implemented such that the method restarts either at predetermined time intervals, at the request of a user, when the environmental conditions information is updated, or when certain predetermined vehicle information changes.

In various exemplary embodiments, the display map can be stored in a memory, such as, for example, the memory 530 of the computer or CPU 510 described above with reference to FIG. 5. Additionally, the vehicle specific information and the environmental conditions annotations can be stored in a vehicle information database and a map annotation database, such as, for example, the vehicle information database 515 and the map annotation database 520, respectively, as described above with reference to FIG. 5.

Figure 7:
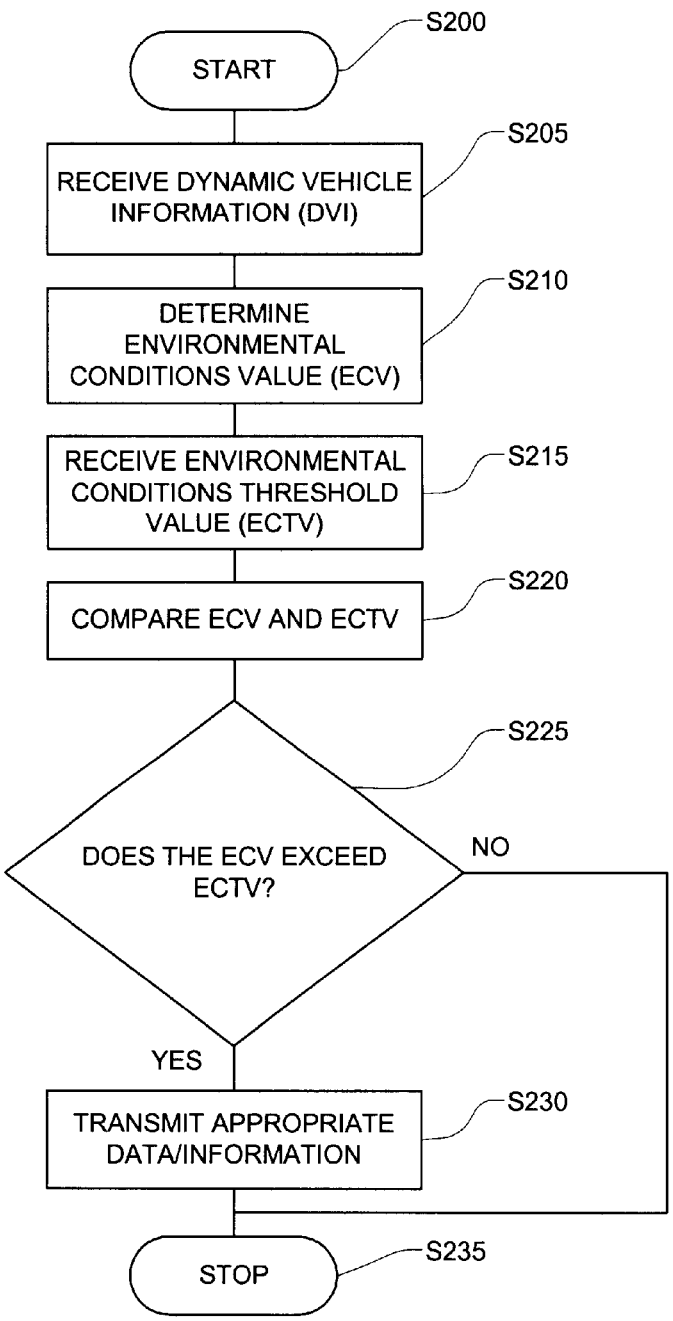
FIG. 7 is a flowchart outlining one exemplary embodiment of a method for determining whether to transmit environmental conditions information according to this invention.

FIG. 7 is a flowchart outlining one exemplary embodiment of a method for determining whether to transmit environmental conditions information according to this invention. In various exemplary embodiments, the environmental conditions information is used to calculate environmental conditions threshold information. The environmental conditions threshold information is calculated using data from various aircraft-, satellite-, or ground-based monitoring and/or sensing equipment, such as, for example the onboard monitoring system 413 of FIG. 4 and algorithms located, for example, in the aircraft characteristics database 414, as described above, with reference to FIG. 4.

As shown in FIG. 7, beginning in step S200, control continues to step S205 where at least some dynamic vehicle information is received. It should be appreciated that the dynamic vehicle information represents information related to the environmental conditions the aircraft is encountering. Then, in step S210, an environmental conditions value is determined for the received dynamic vehicle information. Control then continues to step S215.

In step S215, an environmental conditions threshold value is received.

Next, in step S220, the determined environmental conditions value is compared to the received environmental conditions threshold value. Control then continues to step S220.

In step S225, a determination is made whether the environmental conditions value is greater than the received environmental conditions threshold value. If, in step S225, it is determined that the environmental conditions value is not greater than the received environmental conditions threshold value, control advances to step S235. Otherwise, control continues to step S230.

In step S230, appropriate data and information relating to the environmental conditions, the dynamic vehicle information, the environmental conditions value, and/or the environmental conditions threshold value is transmitted.

Control then continues to step S240 where the method ends.

It should be understood that this method for determining whether to transmit environmental conditions information can be implemented such that the method restarts either at predetermined time intervals, at the request of a user, when environmental conditions information is updated, or when certain predetermined vehicle information changes.

Figure 8:
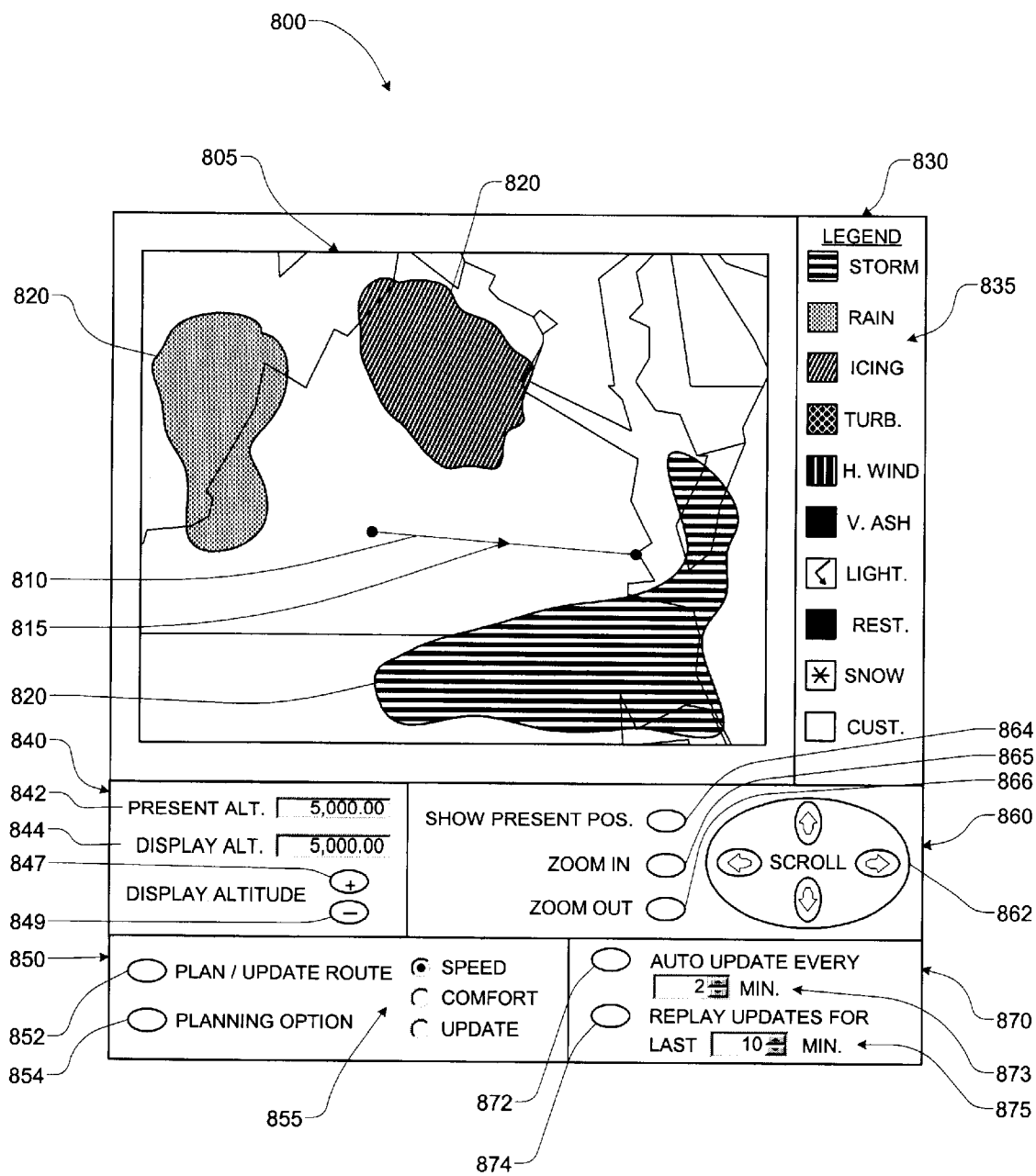
FIG. 8 shows one exemplary embodiment of a display using the environmental conditions display system according to this invention.

FIG. 8 shows one exemplary embodiment of a display using the environmental conditions display system according to this invention. As shown in FIG. 8, the environmental conditions display system 800 includes at least some of a map display portion 805, a legend portion 830, a flight conditions display portion 840, a flight planning/update portion 850, a map display functions portion 860, and/or a display update/replay portion 870.

The map display portion 805 includes at least some of a background map of an area, a flight path line 810, and a reference icon 815 indicating the aircraft's present position and direction along the flight path line 810. The map display portion may also include at least one environmental condition annotation 820 displayed over the background map of the area.

In various exemplary embodiments, the legend portion 830 includes a list of environmental conditions. Each environmental condition is associated with a displayed annotation, such as, for example variable coloring, shading pattern, or iconization. These annotations are used by the environmental conditions display system 800 to alert the pilot to a variety of environmental conditions, as described above. In this manner, the pilot does not have to remember what each of the annotations represents, but is able to quickly reference each displayed environmental condition annotation.

In various exemplary embodiments, the flight conditions display portion 840 includes some of a present altitude display 842, a displayed altitude display 844, and displayed altitude adjustment enable widgets 847 and 849. The present altitude display 842 shows the present altitude of the aircraft. In contrast, the displayed altitude display 844 shows the altitude of the environmental conditions displayed in the map display portion 805. The displayed altitude adjustment enable widgets 847 and 849 allow the pilot to increase or decrease the altitude of the environmental conditions displayed in the map display portion 805. Thus, the pilot is able to investigate the environmental conditions at various altitudes without changing the altitude of the aircraft.

In various exemplary embodiments, the flight conditions display portion 840 also includes a present altitude enable widget, not shown. The present altitude enable widget allows the pilot to automatically return the display to the aircraft's present altitude. Alternatively, this present altitude display function could be accomplished, for example, by depressing both of the displayed altitude adjustment enable widgets 847 and 849 simultaneously.

In various exemplary embodiments, the flight planning/update portion 850 includes some of a plan/update route enable widget 852, a planning option enable widget 854, and a planning option display 855. Selection of the plan/update route enable widget 852 allows the pilot to, for example, input a departure and arrival point and allow the environmental conditions display system 800 to determine a route of travel. The route would be determined using the environmental conditions data and the aircraft information data as described above.

If the aircraft is in flight, or if a route has been planned, the plan/update route enable widget 852 can update, and alter if necessary, the route using updated environmental and aircraft information data.

The planning option enable widget 854 allows the pilot to select the criteria that the plan/update route function uses to determine and/or update the route. For example, if the pilot selects a speed function, the plan/update route function will determine the fastest route from the departure point (or the present position) to the destination, while accounting for the environmental conditions and the aircraft characteristics as described above. If the pilot selects a comfort function, the plan/update route function will determine the least turbulent route from the departure point (or the present position) to the destination, while accounting for the environmental conditions and the aircraft characteristics as described above. Alternatively, the pilot may merely choose an update function, which allows the plan/update route function to update the flight route without changing planning options.

The planning option display 855 allows the pilot to determine which of the planning functions is being used by the plan/update route function to plan/update the route.

In various exemplary embodiments, the map display functions portion 860 includes some of a show present position enable widget 864, a zoom in enable widget 865, a zoom out enable widget 866, and a display scroll enable widget 862. By using the functions of the map display functions portion 860, the pilot is able to view various maps or various sections of the map display portion 805 in greater or less detail. For example, the zoom in and zoom out enable widgets 865 and 866, respectively, allow the pilot to increase or decrease the area displayed by the map display portion 805.

Similarly, the scroll enable widget 862 allows the pilot to maintain a constant zoom factor while moving the area shown in the map display portion 805 up, down, right, or left. The show present position enable widget 864 allows the pilot to return the map display portion 805 to a view that shows the present position of the aircraft, for example, in the center of the map display portion 805.

In various exemplary embodiments, the display update/replay portion 870 includes some of an auto update enable widget 872, an update frequency enable widget 873, a replay enable widget 874, and a replay time set enable widget 875.

By selecting the auto update enable widget 872, the environmental conditions display system 800 will automatically retrieve environmental conditions and aircraft information data and update any environmental condition annotation 820 and/or the flight path 810 as necessary.

The update frequency enable widget 873 allows the pilot to determine how frequently the environmental conditions display system 800 automatically updates.

In various exemplary embodiments, the environmental conditions display system 800 also includes a replay enable widget 874. The replay enable widget 874 allows the environmental conditions display system 800 to recall at least the aircraft positioning information and the environmental conditions information from a determined number of updates and display the information sequentially. Thus, the environmental conditions display system 800 produces an animated display map that allows the pilot to see the way in which various environmental conditions have developed over the determined period of time.

The replay time set enable widget 875 allows the pilot to determine how far back in time the replay function will go to retrieve the environmental conditions data to be displayed.

For example, as shown in FIG. 8, the update frequency function is set to automatically update every two minutes, while the replay time set function is set to include the update information received in the last ten minutes in an animated replay. Thus, if the pilot selects the replay enable widget 874 with these settings, the environmental conditions display system 800 will produce an animated display map consisting of five frames (one for each update) showing any changes in the environmental conditions for the last ten minutes.

Map display software and the display manipulation features described above, such as, for example, the zoom in, zoom out, and route planning/updating functions are familiar to even the lay person who accesses or operates a commercially available map program.

It should be understood that the enable widgets described herein can be any known or later developed mechanism or display for allowing a user to select a particular item or function on a display, such as, for example, a switch, a knob, a dial, a check box, a mark box, a radio button, an enable widget, or the like.

The environmental conditions display system 800 shown in FIG. 8 shows an example of the environmental conditions display system 800 as the environmental conditions display system 800 might appear in a large, passenger aircraft, such as, for example, a Boeing® 777-300™. The environmental condition annotations 820 appear as they might after the systems, methods, and apparatuses of this invention processed received environmental conditions information with reference to aircraft information specific to the Boeing® 777-300™ flying at an altitude of 5,000 feet.

It should also be understood that the actions that can be performed by the environmental conditions display system 800 of this invention are not limited to the actions listed above. The environmental conditions display system 800 of this invention can perform any actions that can be performed by software executing on a programmed general purpose computer, a special purpose computer, a microprocessor or the like.

Figure 9:
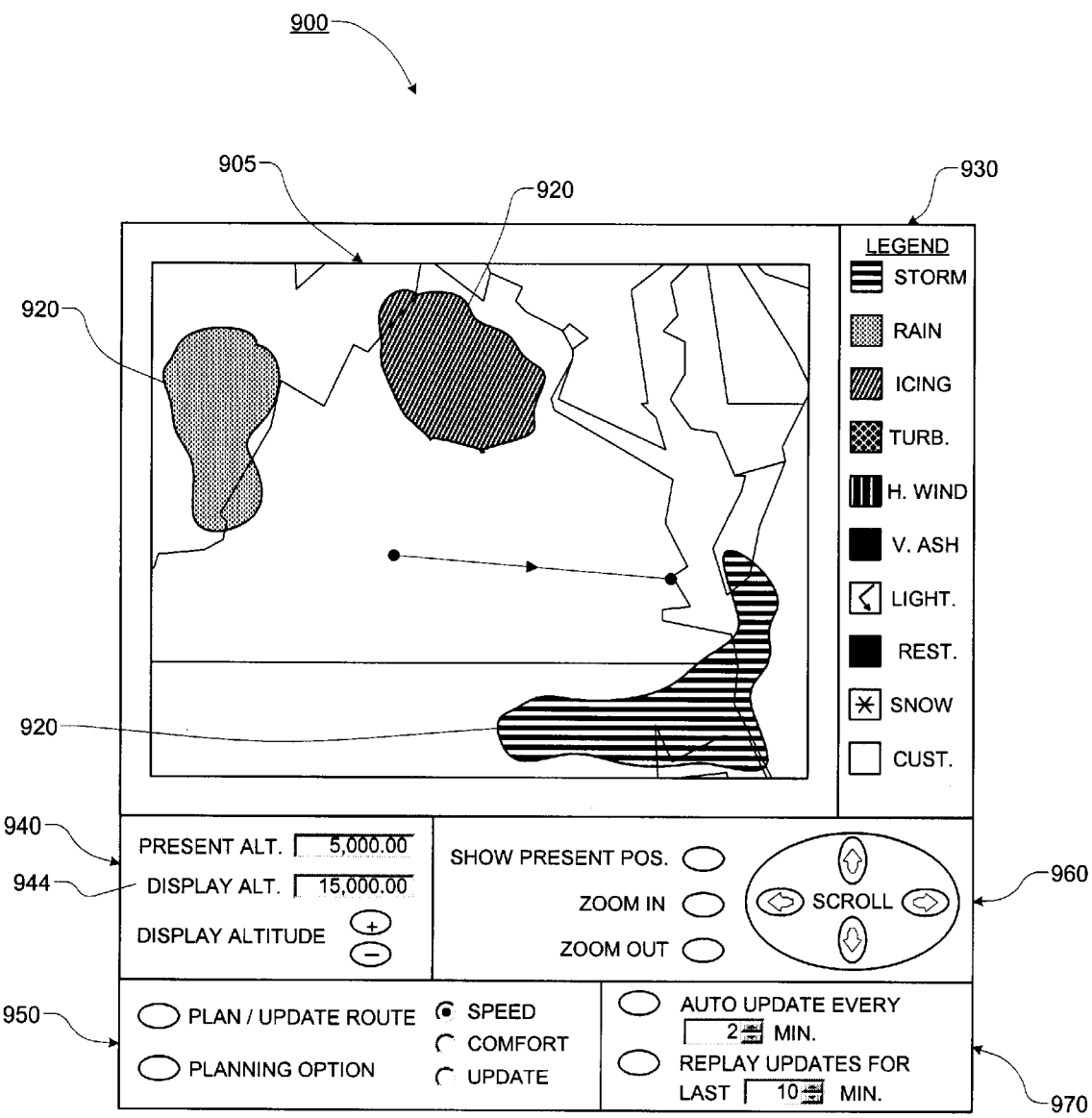
FIG. 9 shows a second exemplary embodiment of a display using the environmental conditions display system according to this invention.

FIG. 9 shows a second exemplary embodiment of a display using the environmental conditions display system according to this invention. As shown in FIG. 9, the environmental conditions display system 900 includes at least some of a map display portion 905, at least one environmental condition annotation 920, a legend portion 930, a flight conditions display portion 940, a flight planning/update portion 950, a map display functions portion 960, and/or a display update/refresh portion 970.

The environmental conditions display system 900 functions similarly to the environmental conditions display system 800, as described above with respect to FIG. 8. However, the environmental conditions display system 900, shown in FIG. 9, is an example of how the map display portion 905 might appear when the pilot uses the altitude adjustment enable widgets 947 and 949 to adjust the displayed altitude.

As shown in FIG. 9, the environmental condition annotations 920 appear as they might after the systems, methods, and apparatuses of this invention process the same environmental conditions data as processed in FIG. 8. Yet, as shown in FIG. 9, the environmental conditions data is processed with reference to aircraft information specific to the Boeing® 777-300™ flying at an altitude of 15,000 feet instead of flying at an altitude of 5,000 feet.

Thus, as shown in FIG. 9, the environmental condition annotations 920 encompass a smaller area than the environmental condition annotations 820, as shown in FIG. 8. The environmental condition annotations 920 reflect a change in the environmental conditions as compared to FIG. 8 because the environmental condition change for a particular aircraft as the aircraft changes altitude, as described above.

Figure 10:
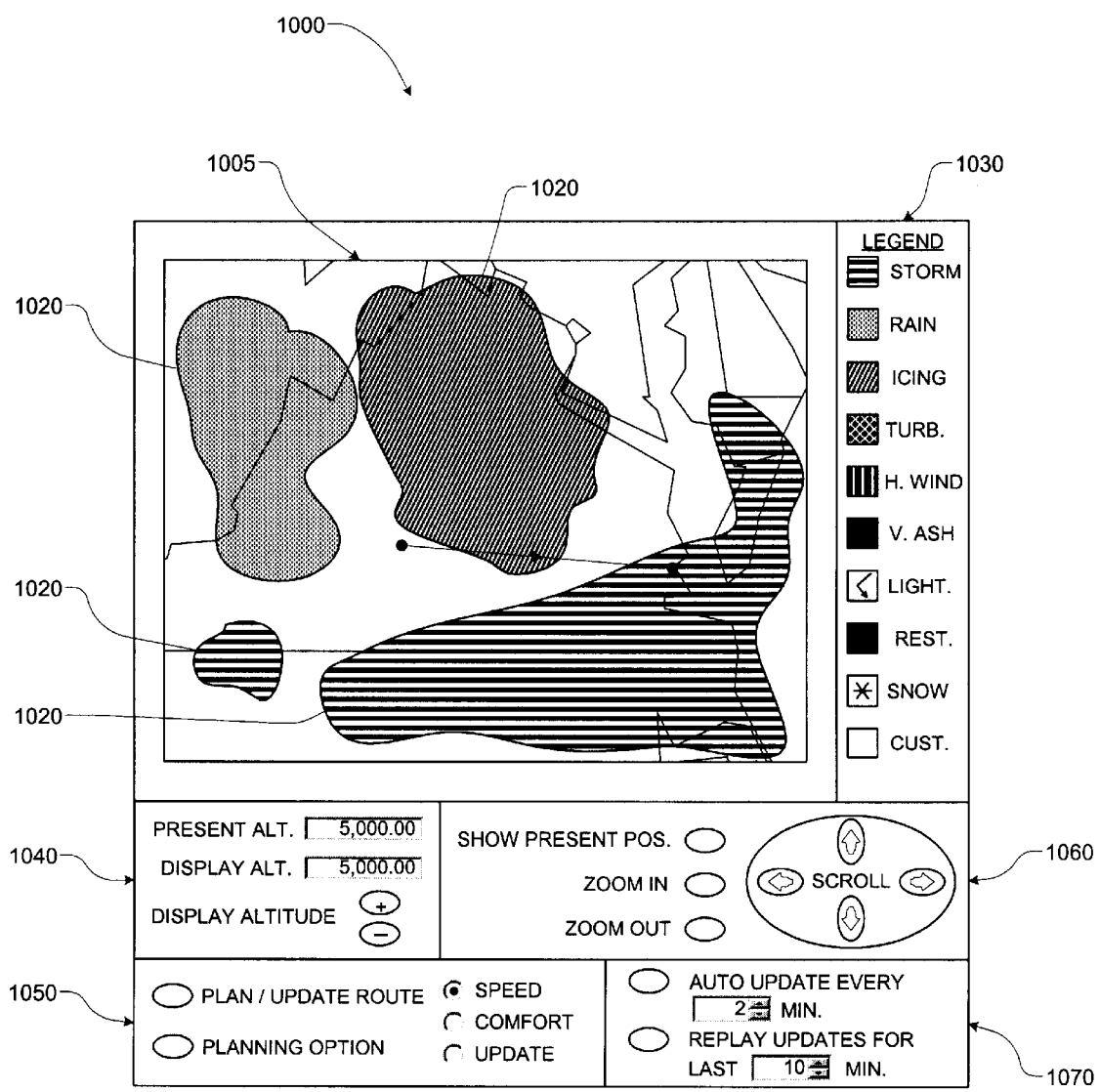
FIG. 10 shows a third exemplary embodiment of a display using the environmental conditions display system according to this invention.

FIG. 10 shows a third exemplary embodiment of a display using the environmental conditions display system according to this invention. As shown in FIG. 10, the environmental conditions display system 1 includes at least some of a map display portion 1005, at least one environmental condition annotation 1020, a legend portion 1030, a flight conditions display portion 1040, a flight planning/update portion 1050, a map display functions portion 1060, and/or a display update/refresh portion 1070.

The environmental conditions display system 1 functions similarly to the environmental conditions display system 800, as described above with respect to FIG. 8. However, the environmental conditions display system 1, shown in FIG. 10, shows an example of the how the map display portion 1005 might appear in a small, single-engine aircraft, such as, for example, a Cessna® 172R™ Skyhawk™. The environmental condition annotations 1020 appear as they might after the systems, methods, and apparatuses of this invention process the same environmental conditions data as processed in FIG. 8. Yet, as shown in FIG. 10, the environmental conditions data is processed with reference to aircraft information specific to the Cessna® 172R™ Skyhawk™ flying at an altitude of 5,000 feet instead of the Boeing® 777-300™ flying at an altitude of 5,000 feet.

Thus, when comparing FIG. 10 to FIG. 8, the environmental condition annotations 1020, shown in FIG. 10, encompass a larger area than the environmental condition annotations 820, shown in FIG. 8. The changes to the environmental condition annotations 820 and 1020 do not reflect a change in the environmental conditions or the altitude of the aircraft. To the contrary, the changes to the environmental condition annotations are due to the characteristics of the smaller aircraft.

Figure 11:
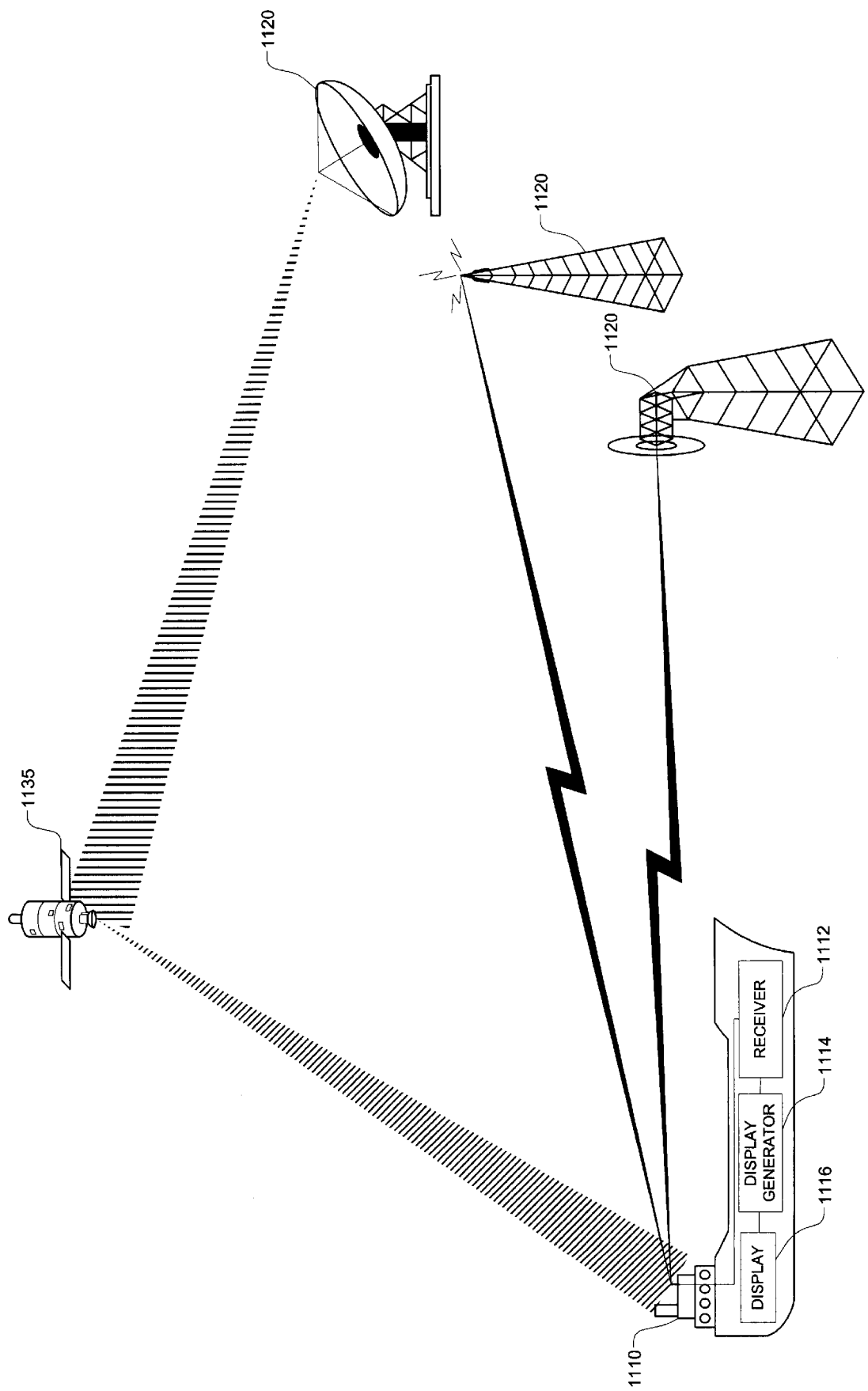
FIG. 11 shows a fourth exemplary embodiment of the environmental conditions display system according to this invention.

FIG. 11 shows a fourth exemplary embodiment of the environmental conditions display system according to this invention. As shown in FIG. 11, the environmental conditions display system 1100 includes at least some of an watercraft 1110, a receiver 1112, a display generator 1114, a display 1116, and at least one environmental conditions transmitter 1120.

The environmental conditions display system 1100 functions similarly to the environmental conditions display system 100, as described above with respect to FIG. 1. However, in various exemplary embodiments, the environmental conditions display system 1100 receives environmental conditions information and processes the received environmental conditions information with reference to watercraft specific information to produce a display that shows environmental conditions annotations for environmental conditions that would affect the specific watercraft.

In various exemplary embodiments of the environmental conditions display system 1100, the environmental conditions display system 1100 functions similarly to the environmental conditions display systems I 00 and 200, as described above with respect to FIGS. 1 and 2. Additionally, in various exemplary embodiments, the environmental conditions display system 1100 employs a display similar to the environmental conditions display systems 800, 900, and/or 1, as described above with respect to FIGS. 8, 9, and 10. However, in various exemplary embodiments, the environmental conditions display system 1100 also includes environmental conditions annotations that reflect nautical environmental conditions, such as, for example, wind speed at sea level, nautical currents, water depth, and wave height.

It should be understood that although some environmental conditions, such as lightning, fog, and/or restricted areas, affect all aircraft regardless of the specific characteristics of the aircraft, the systems, apparatuses, and methods of this invention display appropriate symbols and/or icons to represent the environmental conditions that represent a universal hazard to all aircraft.

It should also be understood that each of the elements of the environmental conditions display system can be implemented as portions of a suitably programmed general-purpose computer. Alternatively, each of the elements of the environmental conditions display system can be implemented as physically distinct hardware circuits within an ASIC, or using a FPGA, a PDL, a PLA or a PAL, or using discrete logic elements or discrete circuit elements. The particular form that each of the elements of the environmental conditions display system will take is a design choice and will be obvious and predicable to those skilled in the art.

Moreover, the environmental conditions display system can be implemented as software executing on a programmed general-purpose computer, a special purpose computer, a microprocessor, or the like.

Thus, in summary, the environmental conditions display system can be implemented on a programmed general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 6 or FIG. 7 can be used to implement the environmental conditions display system.

While this invention has been described in conjunction with the exemplary embodiments outlined above, it is evident that many alternatives, modifications, and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of transmitting environmental conditions information from a vehicle, comprising the steps of:

receiving dynamic vehicle information;

determining an environmental conditions value based on the received dynamic vehicle information;

receiving an environmental conditions threshold;

comparing the environmental conditions value to the environmental conditions threshold;

determining whether the environmental conditions value exceeds the environmental conditions threshold; and transmitting, if the environmental conditions value exceeds the environmental conditions threshold, at least some appropriate information relating to the dynamic vehicle information, the environmental conditions, the environmental conditions value, or the environmental conditions threshold value.

2. The method of claim 1, wherein the dynamic vehicle information is information related to the environmental conditions the vehicle is experiencing.

3. The method of claim 1, wherein receiving dynamic vehicle information includes receiving dynamic vehicle information from a system onboard the particular vehicle.

4. The method of claim 1, wherein the dynamic vehicle information includes data about at least one of the vehicle's weight, performance characteristics, center of gravity, vertical acceleration, lateral acceleration, speed, angle of attack, angle of sideslip, and direction.

5. The method of claim 1, wherein at least some of the dynamic vehicle information is predetermined dynamic vehicle information.

6. The method of claim 1, wherein the step of determining an environmental conditions value based on the received dynamic vehicle information comprises the steps of:

receiving vehicle specific information;

determining, based on the received dynamic vehicle information and the received vehicle specific information, the environmental conditions value.

7. Them method of claim 6, wherein the vehicle specific information includes at least one of the vehicle's size, propulsion, mode of propulsion, structure, type of control system(s), type of control surfaces, longitudinal aerodynamics, lateral aerodynamics, maximum weight, structural limitations, mechanical limitations, performance limitations, safety limitations, maximum operational ceiling, maximum Mach numbers, and maximum airspeeds.

8. The method of claim 6, wherein at least some of the vehicle Specific information is predetermined vehicle specific information.

9. The method of claim 6, wherein at least some of the received vehicle specific information is static vehicle information.

* * * * *